United States Patent
Cheng et al.

(10) Patent No.: US 7,378,074 B2
(45) Date of Patent: May 27, 2008

(54) METHOD OF FORMING A UNIFORM CARBON NANOTUBE ELECTRON-EMISSION LAYER IN A FIELD EMISSION DISPLAY

(75) Inventors: Kuei-Wen Cheng, Guanyin Township, Taoyuan County (TW); Chun-Yen Hsaio, Guanyin Township, Taoyuan County (TW); Jin-Lung Tsai, Guanyin Township, Taoyuan County (TW); Yu-An Li, Guanyin Township, Taoyuan County (TW)

(73) Assignee: Teco Nanotech Co., Ltd, Taoyuan (TW)

( * ) Notice: Subject to any disclaimer, the term of this patent is extended or adjusted under 35 U.S.C. 154(b) by 0 days.

(21) Appl. No.: 11/669,300

(22) Filed: Jan. 31, 2007

(65) Prior Publication Data
US 2007/0295940 A1 Dec. 27, 2007

Related U.S. Application Data

(62) Division of application No. 10/883,722, filed on Jul. 6, 2004.

(51) Int. Cl.
*D01F 9/12* (2006.01)

(52) U.S. Cl. .................... 423/447.1; 252/500; 252/502; 427/81; 106/472; 977/742; 977/832; 977/835

(58) Field of Classification Search ................ 252/500, 252/502; 313/495; 423/447.1; 524/496; 427/81; 106/472; 977/742, 832, 835
See application file for complete search history.

(56) References Cited

U.S. PATENT DOCUMENTS

| 6,331,262 | B1 * | 12/2001 | Haddon et al. | ............. 252/502 |
| 6,783,746 | B1 * | 8/2004 | Zhang et al. | ............ 423/447.1 |
| 2006/0052509 | A1 * | 3/2006 | Saitoh | ........................ 524/496 |

FOREIGN PATENT DOCUMENTS

| JP | 10-120409 | * | 5/1998 |
| WO | WO03/107359 | * | 12/2003 |

* cited by examiner

*Primary Examiner*—Mark Kopec
*Assistant Examiner*—Tri V Nguyen

(57) ABSTRACT

A carbon nanotube suspension uses water as the basic solvent added with dispersant, stabilizer, coalescing aid, adhesion promoter, and a carbon nanotube. The basic solvent and the above solutes form a low viscosity solvent with carbon nanotube suspending therein. Therefore, the carbon nanotube suspension is formed to serve as a source material of the electron emission source of a field-emission display. That is, the carbon nanotube can be coated on a surface for forming the carbon nanotube electron-emission layer.

8 Claims, 3 Drawing Sheets

(3a)

(3b)

(3c)

(3d)

METHOD OF FORMING A UNIFORM CARBON NANOTUBE ELECTRON-EMISSION LAYER IN A FIELD EMISSION DISPLAY

This application is a divisional application of U.S. patent application Ser. No. 10/883,722, filed on Jul. 6, 2004.

BACKGROUND OF THE INVENTION

The present invention relates in general to a carbon nanotube suspension, and more particularly, to a solvent containing carbon nanotube suspending therein. The carbon nanotube suspension can be used for forming an electron-emission source of a field-emission display.

The field-emission display is a very newly developed technology. Being self-illuminant, such type of display does not require a back light source like the liquid crystal display (LCD). In addition to the better brightness, the viewing angle is broader, power consumption is lower, response speed is faster (no residual image), and the operation temperature range is larger. The image quality of the field-emission display is similar to that of the conventional cathode ray tube (CRT) display, while the dimension of the field-emission display is much thinner and lighter compared to the cathode ray tube display. Therefore, it is foreseeable that the field-emission display may replace the liquid crystal display in the market. Further, the fast growing nanotechnology enables nano-material to be applied in the field-emission display, such that the technology of field-emission display will be commercially available.

FIG. 1 shows a conventional triode field-emission display, which includes an anode plate 10 and a cathode plate 20. A spacer 14 is placed in the vacuum region between the anode plate 10 and the cathode plate 20 to provide isolation and support thereof. The anode plate 10 includes an anode substrate 11, an anode conductive layer 12 and a phosphor layer 13. The cathode plate 20 includes a cathode substrate 21, a cathode conductive layer 22, an electron emission layer 23, a dielectric layer 24 and a gate layer 25. A potential difference is provided to the gate layer 25 to induce electron beam emission from the electron emission layer 23. The high voltage provided by the anode conductive layer 12 accelerates the electron beam with sufficient momentum to impinge the phosphors layer 13 of the anode plate 10, which is then excited to emit a light.

The lately developed carbon nanotube has been applied to form the electron-emission source of a field-emission display due to its specific characteristics. The carbon nanotube is typically formed on a cathode plate for generating electron beams. Currently, the carbon-nanotube electron-emission source is formed by screen printing and has viscosity as high as 100,000 cps. With such high viscosity, it is very difficult to obtain an even surface. As a result, the distance between the electron-emission layer and the gate layer of the same cathode unit is non-uniform, such that the electric field cannot be uniform to generate uniform electron beams in each position. That is, when the gap between the electron-emission layer and the gate layer is shorter, the electric field is larger, and more electrons are emitted. The very high viscosity of the carbon nanotube mixture is very difficult to distribute. Therefore, dispersing technique based on its mechanism and physical property has is required. Even when the carbon nanotube mixture is distributed by mechanical and physical property, an even thickness is still difficult to obtain. Therefore, non-uniform electron beams are emitted. As a result, uneven brightness in a single luminescent unit occurs, such that the image quality is degraded. In addition, although the carbon nanotube mixture has very high viscosity, the adhesion is insufficient. Therefore, adhesion additive such as glass powder is often required to further complicate the process.

BRIEF SUMMARY OF THE INVENTION

A carbon nanotube suspension is provide to serve as the source material for the electron emission source of a field-emission display. The electron-emission source can be easily formed by a coating process.

A carbon nanotube suspension is provided with a reduced viscosity such that it is more easily and evenly distributed on a surface.

A carbon nanotube suspension is provided with a viscosity sufficiently low that it can be coated with an even thickness.

The carbon nanotube suspension as discussed above uses water as the solvent, and dispersant, stabilizer, coalescing aid, adhesion promoter and carbon nanotube as the solutes to form a low-viscosity solution with carbon nanotube suspending therein.

BRIEF DESCRIPTION OF THE DRAWINGS

The above objects and advantages of the present invention will be become more apparent by describing in detail exemplary embodiments thereof with reference to the attached drawings in which.

DETAILED DESCRIPTION OF THE INVENTION

A carbon nanotube suspension is provided using water as the solvent, which is added with dispersant, stabilizer, coalescing aid, adhesion promoter and antifoam to form a low-viscosity solution. A carbon nanotube no longer than 1 micron is then immersed in the low-viscosity solution to form the carbon nanotube suspension. The proportion of the solutes and the nanotube is as follows:

1. carbon nanotube: 5% to 20%;
2. coalescing aid: 5% to 20%, including aluminum sodium sulfate, silane coupling agent, alkyd resin or tetra-ethyl-ortho-silicate (TEOS), or the combination of any of these components, such that the suspension can be easily attached to the glass substrate of the field-emission display;
3. adhesion promoter: 1% to 5%, including PVA, PVP, methyl cellulose, ethyl cellulose, sodium polyacrylate, or ammonium polyacrylate for increasing adhesion of the suspension, so as to control the film thickness.
4. stablizer: 0.5% to 5%, including one of ammonia, potassium hydroxide, and sodium hydroxide, such that storage life is longer, and the carbon nanotube has sufficient time to disperse;
5. dispersant: 1% to 10%, including ethyl hydroxide and organic alkyl eikonogen for motivating the nanotube dispersing in the suspension; and 6. antifoam: 1% to 10%, including polypropylene glycol (PPG) to eliminate foams or bubbles caused by stir.

Figure 1:
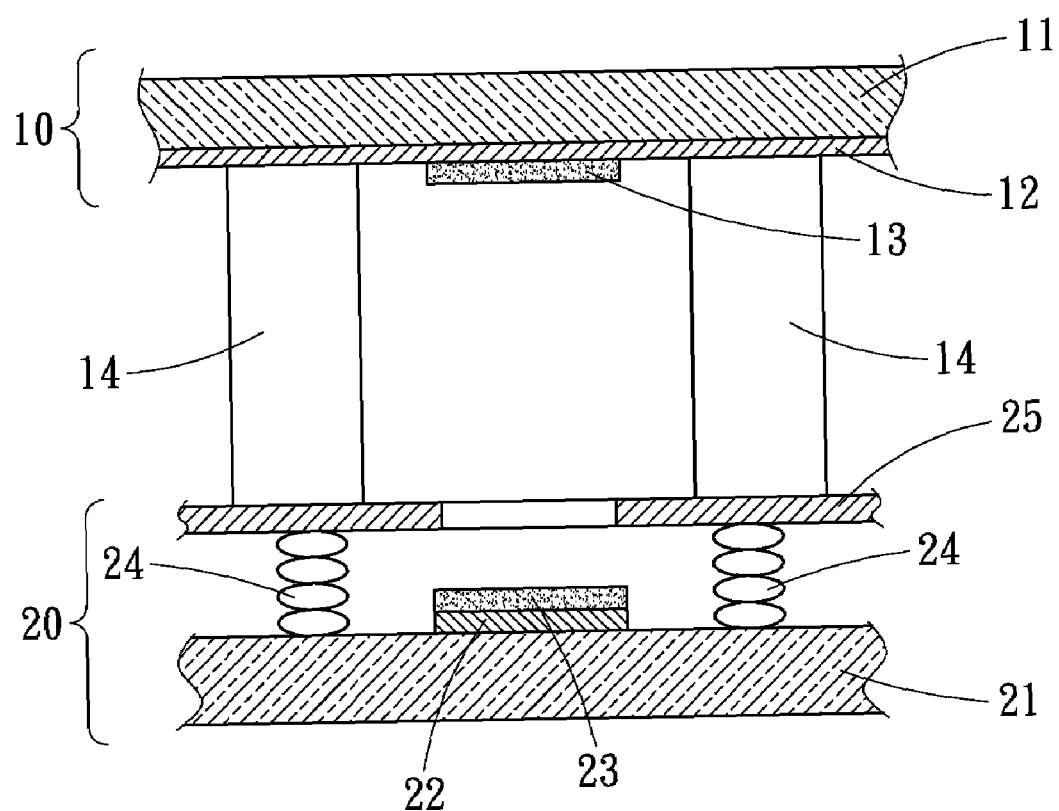
FIG. 1 shows a cross sectional view of a conventional triode field-emission display.
Figure 2:
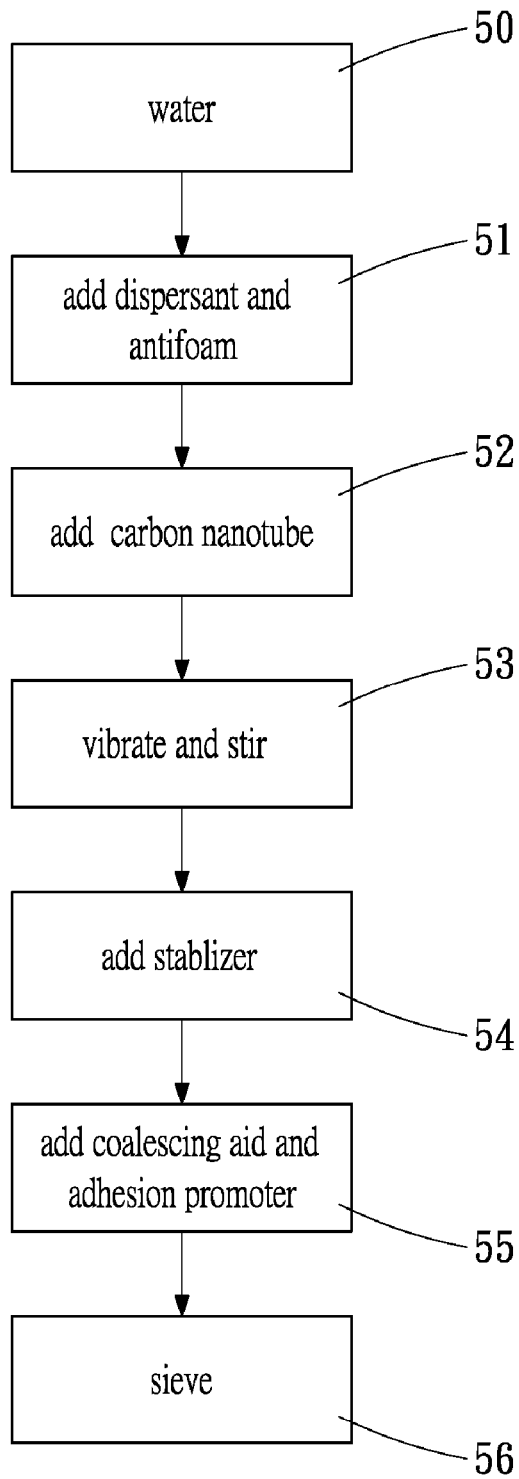
FIG. 2 shows the process of forming the carbon nanotube suspension.

The composition and fabrication method are illustrated in FIG. 2. In step 50, water is used as the solvent. In the mixing process, the total mass of the solvent is used as a reference for calculating the weight percentage of each solute.

In step 51, 5% of organic methyl alkyl eikonogen (dispersant) and 5% of antifoam are added in the solvent.

In step 52, 10% of carbon nanotube is added in the mixture of water, dispersant and antifoam.

In step 53, the mixture obtained in step 52 is vibrated and stirred using ultrasonic vibration technique. The vibration and stir are performed for about 3 hours.

In step 54, 1% of ammonia (stabilizer) is added in the vibrated mixture, and the mixture added with ammonia is further stirred.

In step 55, 5% of aluminum sodium sulfate (coalescing aid), 10% of silane coupling agent (coalescing aid), 2.8% of PVA (adhesion promoter) and 2% of ethyl hydroxide (dispersant) are added in the mixture.

In step 56, the mixture obtained from step 55 is sieved by a 500 mesh to form a low-viscosity carbon nanotube suspension.

The above composition provides a carbon nanotube suspension with viscosity as low as 24 pcs, while the proportion of solid component is about 14%. Such carbon nanotube suspension has much lower viscosity compared to currently available carbon nanotube suspension. It can be easily coated into a uniform form. The dispersant performs chemical dispersion such that the carbon nanotube in the suspension will not agglomerate. Therefore, the carbon nanotube suspension can be used for forming uniform electron-emission layer in a field-emission display.

Preferably, the carbon nanotube suspension can be used for forming the electron-emission source on a cathode substrate by vacuum sintering process, in which the carbon nanotube of the suspension is directly attached to the cathode substrate to form the electron emission layer. Therefore, no adhesive additive such as glass powder is required. As a result, the deposit density of the carbon nanotube in the suspension will not be diluted by addition of the adhesive additive.

Figure 3:
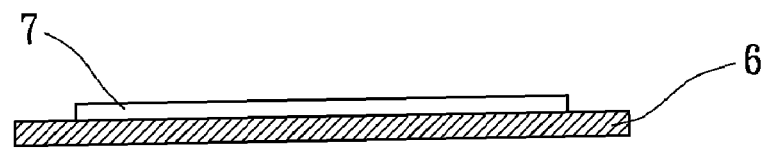
FIGS. 3a through 3d show the fabrication process of the electron emission source using the carbon nanotube suspension.
Figure 3:
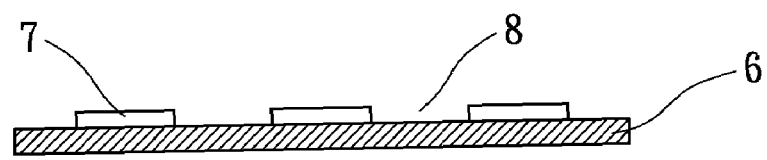
Figure 3:
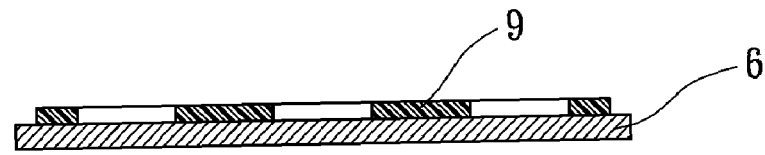
Figure 3:
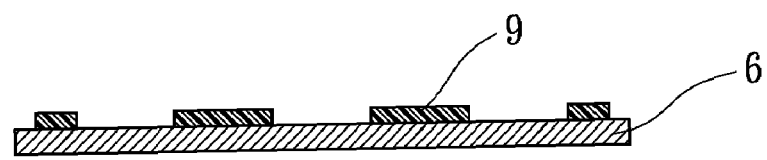

FIG. 2 shows the method for fabricating the electron-emission layer on a cathode substrate using the carbon nanotube suspension. In FIG. 3, a negative photoresist is used, and photolithography and etching process is performed for forming and patterning the electron-emission layer. The carbon nanotube electron-emission layer is formed by vacuum sintering process.

As shown in FIG. 3a, a cathode substrate 1 is provided.

In FIG. 3b, a photoresist layer 2 is formed on the cathode substrate 1 by photolithography and etching process. By such patterning technique, a plurality of discrete electron emission regions 3 is formed.

As shown in FIG. 3c, the carbon nanotube suspension is directly coated in the electron-emission regions 3.

In FIG. 3d, etching and development process is performed to remove the photoresist layer. Vacuum sintering is performed to attach the electron-emission layer on the cathode substrate 1 as shown.

The electron-emission layer fabricated from the carbon nanotube suspension by the above method has a very uniform thickness. Therefore, the image quality of the field-emission display is greatly enhanced.

While the present invention has been particularly shown and described with reference to preferred embodiments thereof, it will be understood by those of ordinary skill in the art the various changes in form and details may be made therein without departing from the spirit and scope of the present invention as defined by the appended claims.

What is claimed is:

1. A method of forming a carbon nanotube electron-emission layer in a field emission display, comprising the sequence of steps as follows:
    a) providing a carbon nanotube suspension by adding water as a solvent, uniformly adding 5% to 20% by weight of carbon nanotube which is shorter than 1 micron, 1% to 10% by weight of dispersant for motivating the carbon nanotube dispersing in the suspension, and 1% to 10% by weight of antifoam in the solvent for eliminating foams or bubbles caused by stirring;
    b) vibrating and stirring the mixture of water, dispersant, antifoam and carbon nanotube for a predetermined period of time;
    c) adding stabilizer in the mixture for prolonging storage life of the suspension and the carbon nanotube having sufficient time to disperse and stirring the mixture;
    d) adding 5% to 20% by weight of coalescing aid for the suspension easily being attached to a glass substrate of a field-emission display, 1% to 5% by weight of adhesion promoter for increasing adhesion of the suspension so as to control a film thickness formed on the glass substrate and stirring the mixture;
    e) sieving the mixture by a mesh to form a low-viscosity carbon nanotube suspension as low as 24 cps (centipoises), wherein a proportion of solid component is about 14% by weight, wherein the dispersant performs chemical dispersion such that the carbon nanotube in the suspension is not agglomerate, and the suspension is easily coated into a uniform form to be used for forming a uniform electron-emission layer in the field-emission display; and
    f) performing a vacuum sintering process, in which the carbon nanotube of the suspension is directly attached to a cathode substrate to form the electron emission layer without requiring an adhesive additive of glass powder to prevent a deposit density of the carbon nanotube in the suspension from being diluted by addition of the adhesive additive.

2. The method of claim 1, wherein the dispersant includes ethyl hydroxide or organic methyl eikonogen.

3. The method of claim 1, wherein the antifoam includes polypropylene glycol (PPG).

4. The method of claim 1, wherein the coalescing aid includes one or more than one of aluminum sodium sulfate, silane coupling agent, alkyd resin and tetra-ethyl-orthosilicate (TEOS).

5. The method of claim 1, wherein the adhesion promoter includes PVA (polyvinyl alcohol), PVP (polyvinyl pyrrolidone), methyl cellulose, ethyl cellulose, sodium polyacrylate or ammonium polyacrylate.

6. The method of claim 1, wherein the stabilizer includes sodium hydroxide, potassium hydroxide or ammonia.

7. The method of claim 1, wherein the vibration and stirring process includes an ultrasonic vibration and stirring process.

8. The method of claim 1, wherein a 500 mesh is used for sieving the mixture.

* * * * *